May 28, 1940.　　　E. F. PAWSAT　　　2,202,426
BICYCLE STAND
Original Filed June 3, 1938
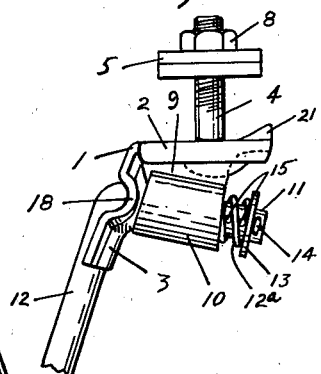
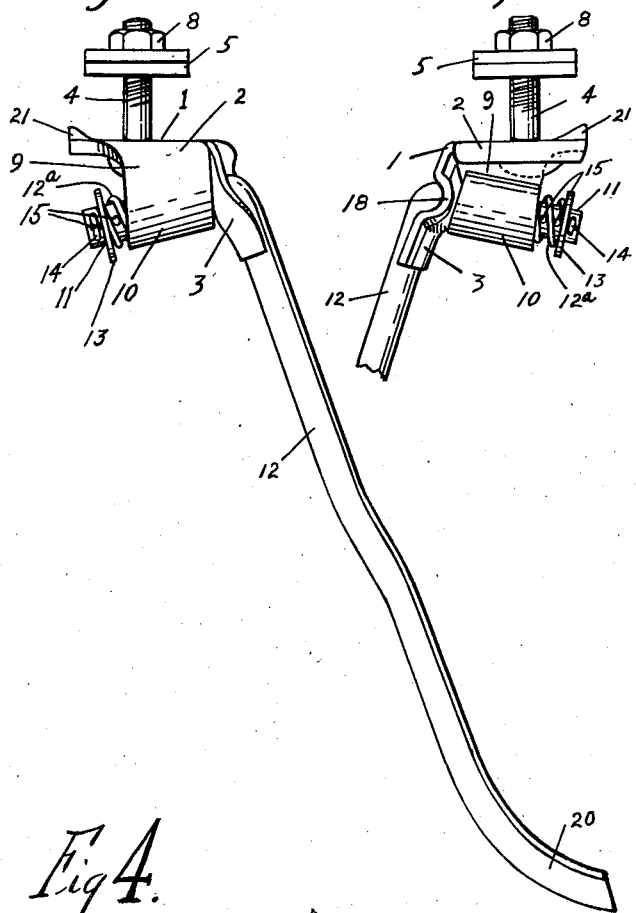
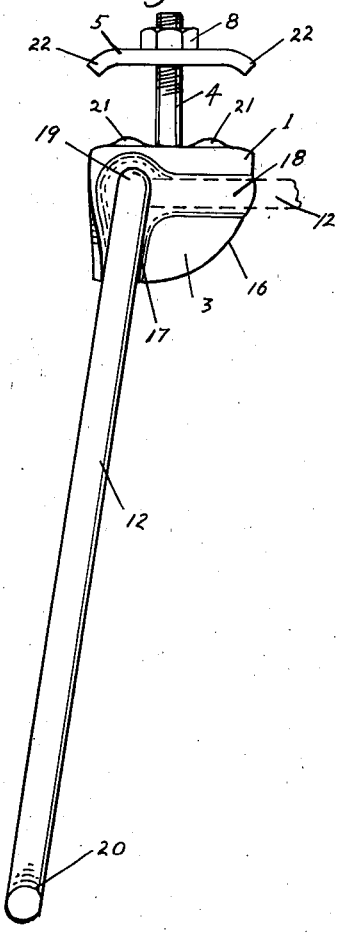
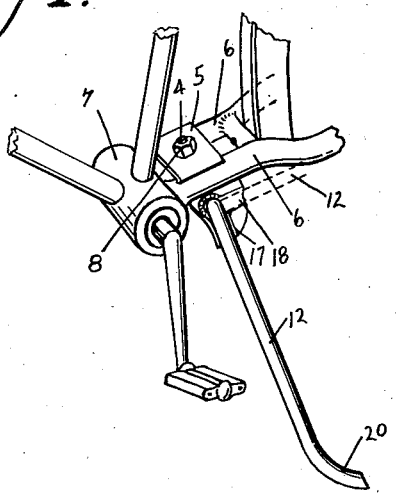
Inventor.
Ewald F. Pawsat,
By Arthur H. Ewald
Attorney.

Patented May 28, 1940

2,202,426

UNITED STATES PATENT OFFICE 2,202,426

BICYCLE STAND

Ewald F. Pawsat, Maysville, Ky., assignor to Wald Manufacturing Company, Incorporated, a corporation of Kentucky Refiled for abandoned application Serial No. 211,561, June 3, 1938. This application December 11, 1939, Serial No. 308,677

1 Claim. (Cl. 280—301)

The present invention relates to bicycle stands of the type which may be secured to the vehicle and serve as a support to maintain the same in upright position when not in use.

The principal object of the present invention is to provide a simple and efficient stand of the type mentioned which may be secured to the frame of the bicycle immediately in back of the crank hanger of such vehicle, the supporting standard of such stand being adapted to turn upwardly and rearwardly into an inoperative position.

A further object of the invention is to provide in a stand of the type mentioned a plate for the attachment of the supporting standard to the vehicle wherein an improved bearing element for the standard is contained, thus facilitating the raising and lowering of the standard as well as giving increased durability and rigidity to the device.

Further objects of the invention will appear from the following detailed description thereof.

In the drawing:

Figure 1 is a front elevation of a bicycle stand constructed in accordance with this invention;

Figure 2 is a rear elevation of said stand, the lower portion of the standard having been broken away;

Figure 3 is a side elevation of the device;

Figure 4 is a perspective illustrating the attachment of the stand to a bicycle.

The numeral 1 indicates the main or bearing plate of my new stand. The plate 1 has an upper horizontal section, 2, and a downwardly and outwardly inclined lateral section 3. The section 2 is perforated to receive an attaching bolt 4. The numeral 5 indicates a clamping plate which is perforated to fit on the bolt, 4, and which cooperates with the section 2 of the plate 1 to secure the plate 1 to the bifurcated frame rods 6—6 of the bicycle immediately in back of the crank bearing hanger 7, the bolt 4 passing between said rods 6—6. A nut 8 secures the assembly. The plate 1 is provided with a front section 9 which extends downwardly from the horizontal section 2 and is substantially vertically disposed thereto. The lower end of the vertical section 9 of the plate is bent to form a cylinder, 10, the axis of which is vertically disposed with respect to the section 3 of the plate, and in registering alignment with an opening in said section 3. The opening in the section 3, together with the cylinder 10 are adapted to receive the bearing section 11 of the supporting standard 12; the cylinder is, however, of greater diameter than the section 11 so as to be sufficient also to receive a coiled spring 12a surrounding said bearing section. The spring 12a is placed under compression between the section 3 of the plate and a washer or nut 13 secured on the free end of the bearing section 11. Where a washer 13, as illustrated in the drawing is used, I preferably secure same by means of a cotter pin 14, which is adapted to extend into any of a series of holes, 15 in the section 11, thereby providing for adjustability of the spring compression. The lower and rear sides of the section, 3 of plate 1 may be shaped to form an arc 16, and said section is provided with channels 17 and 18 which extend respectively downwardly and rearwardly from the opening 19 in said section.

The lower end of the standard 12 forms an outwardly inclined foot, 20, which is adapted to rest on the ground or pavement when the standard is in operative position. The upper surface of the section 2 of the plate 1 opposite section 3 is provided with upturned studs 21—21 the upper surfaces of which are adapted to cooperate with the downwardly inclined ends 22—22 of the plate 5 in securing the device to the frame members 6—6.

From the foregoing description the attachment and operation of the device will, it is thought, be obvious to those skilled in the art to which same appertains. When the plates 1 and 5 are secured to the bicycle frame as above indicated and shown in Figure 4 of the drawing, it will be seen that the standard 12 mounted in section 3 and the cylinder 10 will be free to turn either into the downwardly and outwardly extended position illustrated in full lines in the drawing, or to the upwardly and rearwardly extended position shown in broken lines in Figures 3 and 4. In either position the upper portion of the standard 12 is maintained in one of the channels 17 or 18 due to the compression of the spring 12a. As shown in full lines the standard when secured in channel 17 is in bicycle supporting position; when supported in the channel 18, as illustrated in broken lines, the standard is in raised or inoperative position, in which position it does not, of course interfere in any manner with the operation of the vehicle.

As will be seen the cylinder 10 carried by the section 9 provides a long and rigid bearing and housing for the rotating section 11 of the standard thus assuring the ready and easy rotation of the standard in its bearings when operated, as is usually the case, by the foot of the user. This, of course, adds durability as well as rigidity and efficiency to the device. It will furthermore be seen that the housing provided by cylinder 10 is adapted to retain a suitable lubricant for the spring and rotating section of the standard thus further facilitating the operation of the device and adding to the durability thereof.

This application is refiled for abandoned application No. 211,561, filed June 3, 1938.

Having thus fully described my invention what I claim as new and desire to secure by Letters Patent is:

A device of the character specified comprising a plate having an upper attaching section, a downwardly and outwardly inclined section on said upper section, said inclined section having a perforation, a standard bent to form an axial section adapted to fit through said perforation, a grooved channel extending from said perforation downwardly in its outer surface to the edge of said section, a second grooved channel in its outer surface extending from said perforation rearwardly and substantially horizontally to the edge of said section, a downwardly disposed section on said upper section substantially at right angles to said inclined section, the lower end of said downwardly disposed section being bent to form a cylindrical bearing contiguous to and in alignment with said perforation and arranged to receive the axial end of said standard, a coiled spring around the axial end of said standard inside said cylinder arranged to maintain the main section of said standard in contact with the outer surface of said inclined section and means for securing said plate to a vehicle.

EWALD F. PAWSAT.